United States Patent
Zollars et al.

[11] Patent Number: 5,737,085
[45] Date of Patent: Apr. 7, 1998

[54] PRECISION OPTICAL DISPLACEMENT MEASUREMENT SYSTEM

[75] Inventors: Byron G. Zollars; Robert C. Chin; Gary B. McMillian, all of Austin; Tommy C. Cruce, Leander; William H. Hallidy, Austin, all of Tex.

[73] Assignee: Systems & Processes Engineering Corporation, Austin, Tex.

[21] Appl. No.: 822,556

[22] Filed: Mar. 19, 1997

[51] Int. Cl.[6] .................................................. G01B 11/24
[52] U.S. Cl. .................... 356/376; 356/372; 356/237; 356/380; 356/373; 356/375
[58] Field of Search .................................. 356/376, 237, 356/372, 380, 373, 375

[56] References Cited

U.S. PATENT DOCUMENTS 5,442,172  8/1995  Chang et al. ...................... 250/237

Primary Examiner—Frank G. Font
Assistant Examiner—Reginald A. Ratiff
Attorney, Agent, or Firm—Hutcheson & Grundy LLP

[57] ABSTRACT

Apparatus and method for measuring the relative distance between different areas on a remote surface or displacements of a selected area of a remote surface with respect to a measuring apparatus are provided. A laser beam is modulated at an RF frequency and focused on a selected area. The selected area is scanned by movement of a mirror and at each selected area the phase difference is measured. Digital data processing of signals derived from the source and return beams is used to provide high precision. For detecting or measuring vibration or displacement, an analog signal is obtained from a low-pass filter.

16 Claims, 1 Drawing Sheet

PRECISION OPTICAL DISPLACEMENT MEASUREMENT SYSTEM

STATEMENT REGARDING FEDERALLY SPONSORED RESEARCH

The U.S. Government has a paid-up license in this invention and the right in limited circumstances to require the patent owner to license others on reasonable terms as provided for by the terms of Contract No. N00146-94-C-0105, awarded by the U.S. Navy.

FIELD OF THE INVENTION

This invention pertains to optical measurements. More particularly, apparatus and method are provided for remote measurement of surface profiles or surface displacement.

BACKGROUND OF THE INVENTION

Optical measurements of distance or dimensions have been widely used. It was obvious from the time of its development that the laser would be very useful in such measurements. For long distances, pulsed lasers are used, and range is determined by measuring the time of arrival of a reflected light pulse. Beam modulation methods have also been used, using either amplitude or polarization modulation. With beam modulation distance measurements, the phase for the returning beam is compared with that of the output beam. Such methods are described, for example, in *Handbook of Optics*, Vol. 2, pp. 29.3–29.12. Other distance measurement techniques involve interferometry for small or medium distances. Interferometric methods require a highly coherent light source and may be significantly degraded by noise introduced from surface speckle and other sources.

The triangulation method for measuring distance is based on setting a laser and a photo detector at a known separation and then measuring the angle between the incident laser radiation at the surface and the detected radiation at the receiver. The method is suitable for small distances, but is not applicable to measurement of narrow points, edges and curvatures such as could occur on objects with very complex contours and openings.

U.S. Pat. No. 4,689,489 discloses a method for determining the level of the surface of a material in a storage tank by modulating an optical radiation beam at a radio frequency and transmitting the beam to the surface of the material, receiving the beam reflected from the surface and adjusting the frequency in order to obtain phase equality of the modulation in the measurement path and in a reference path to derive the level of the material in the tank. The transmitter of the laser beam and the receiver for the reflected beam are separated. U.S. Pat. No. 5,396,510 discloses an optical distance, velocity and acceleration sensor based on a reflected laser signal which is compared with a reference signal in a phase comparator to produce a signal indicative of the phase difference between the oscillator signal and the reflected laser.

Precision machining and grinding processes are designed to remove material within an accuracy of about 5.1 micrometers (0.0002 inches). If an optical method is to be used to measure distance to within this degree of accuracy, and the optical method is to be placed at a distance of about 1 meter from the surface, the required accuracy of the method is about 5 parts per million. Conventional methods of performing these processes involve measuring the original dimensions of the work, machining, removing and measuring the work, performing more machining, removing and measuring the work and repeating. These methods are cumbersome, time-consuming, subject to error, and require constant operator intervention.

There is a need for optical apparatus and method which can be used to measure variations in distance between different areas of a surface, or the same area at different times, and a remote source of light. These measurements should be made to a high degree of accuracy. Such apparatus and method may be used in high-precision machine manufacture, for measuring thicknesses of materials, for determining contours of the surface of materials, for plotting surface profiles or roughness of materials, for measuring oscillatory or linear motion, and for other applications requiring high resolution displacement measurements.

SUMMARY OF THE INVENTION

Apparatus and method are provided for measuring differences in distances between optical apparatus and a remote surface as a light source is scanned over the remote surface or as the light source is stationery and the surface moves. A light source is modulated in amplitude at radio frequency (RF) and focused through an optical system on a selected area of the surface. Scattered and reflected light is collected, preferably through the same optical system. A signal having an amplitude proportional to the cosine of the difference in phase of the source and scattered light is produced electronically and signals are digitized and processed to produce an average phase difference. A known measurement of distance from a selected reference point on the apparatus and a remote point on the surface allows measurement of electronic delay in the apparatus. The apparatus can then be used to measure absolute values of distance to a remote surface. Measurements made while scanning a light beam over different spots on a surface are used to measure differences in distance from the apparatus to the selected spots, using measured differences in modulation frequencies which produce zero-phase difference in free space. Also, the light beam may be fixed on a selected area and the vibration or displacement of that area with respect to the apparatus may be detected.

DETAILED DESCRIPTION OF PREFERRED EMBODIMENT

Figure 1:
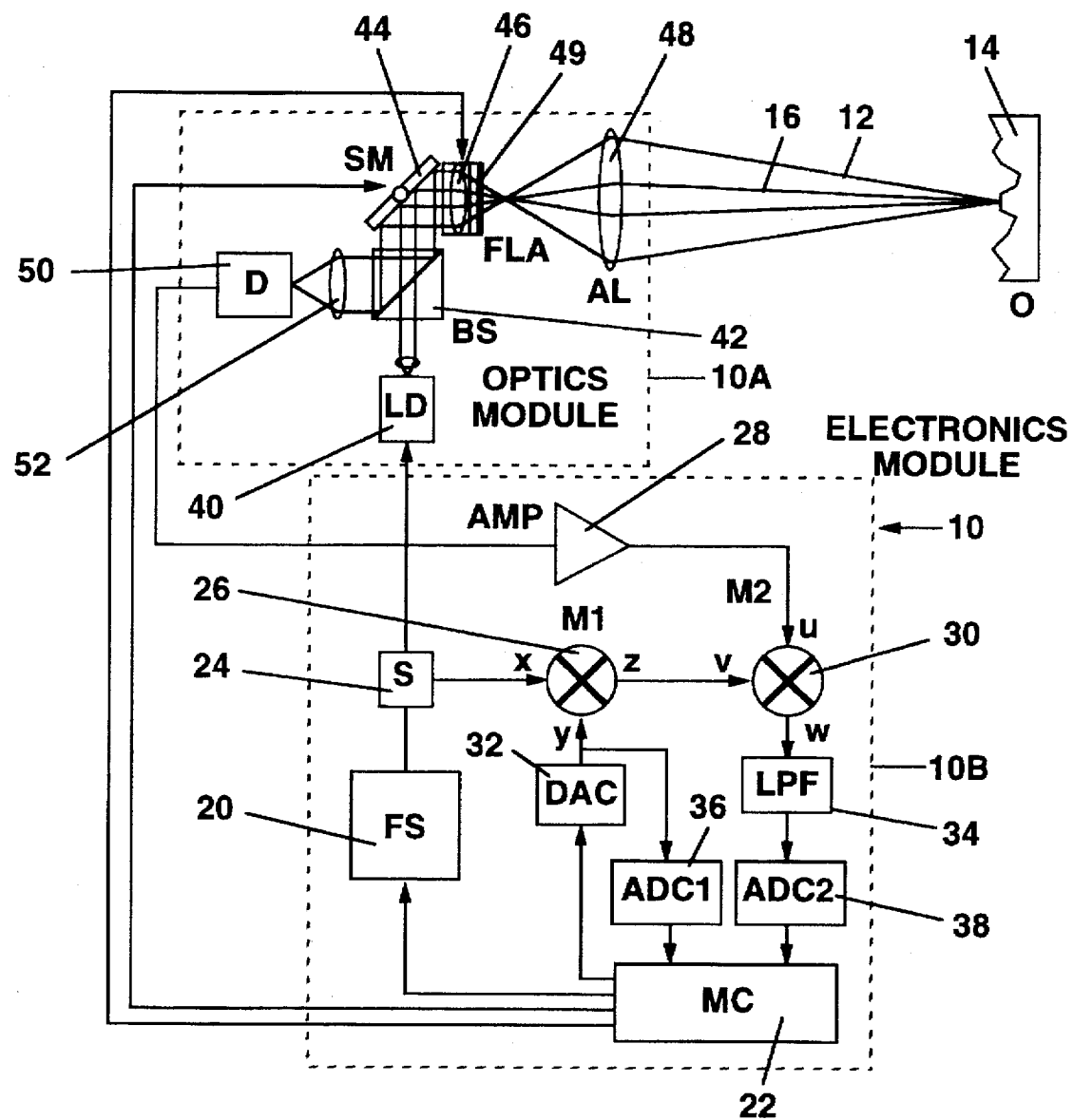
FIG. 1 is a block diagram of the precision optical displacement measurement system of this invention.

Referring to FIG. 1, measurement apparatus 10 is comprised of two distinct modules: optics module 10A and electronics module 10B. Measurement apparatus 10 functions by directing amplitude modulated light beam 16 to remote object 14, upon which the surface profile is to be determined or the displacement of which is to be measured. Although a laser diode is preferred as the source of light, it should be understood that any source of electromagnetic radiation which can be modulated at RF frequencies may be used. The power in the light source and the wavelength used may be selected dependent on the application and the time allowable for making a measurement. Higher power light sources will allow more rapid measurements, but may create safety or other concerns if power is excessive. Object 14 is shown to have a surface profile which is to be measured. Alternatively, remote object 14 may be a combination of flat surfaces separated by a displacement which is to be measured, a cylindrical rod for which the diameter or runout is to be measured, a flat surface for which the orientation angle is to be measured, a curved surface for which the contour is to be measured, an object with a hole or depression for which depth is to be measured, or an object moving relative to the instrument (along the beam) for which vibration or linear velocity or acceleration is to be measured. A feature of the present invention is that the diffuse backscatter from object 14, indicated by beam 12, is collected by the same optical system as used to project the incident laser beam. This feature eliminates the "shadowing" from edges or steps in objects, which is common in triangulation devices, and its use is a preferred embodiment of the invention. Alternatively, outgoing and incoming light beams can be separate. The detected signal is compared with the signal used to modulate the laser, and the relative phase of these two signals is measured electronically. The relative phase is due to the electrical delay through the system plus the optical round trip travel delay through free space to and from object 14. The optical delay is a function of the distance from a selected reference point on apparatus 10 to the laser or other light focal spot on object 14. When the apparatus is about 1 meter from the remote surface, scanning the focal spot over the object and repeatedly measuring the range allows determination of the shape of the surface of object 14 to an accuracy of about 5 microns. The laser focal spot may also be scanned to the surface of another object so as to measure the difference in distance to the surfaces of two or more objects.

Referring to electronics module 10B, frequency synthesizer 20, whose frequency is controlled by microcontroller 22, emits a sinusoidal RF electrical waveform, preferably having a frequency between about 250 MHz and 400 MHz. The electrical waveform is preferably furnished by a phase-lock loop frequency synthesizer. The electrical waveform is directed to signal splitter 24. Signal splitter 24 delivers a replica of the signal from synthesizer 20 to laser diode 40 in optics module 10A. A signal is also delivered to mixer 26, which is preferably a double balanced mixer. At laser diode 40, the signal is used to amplitude-modulate the emitted laser radiation. The laser light, which is linearly polarized in the P-plane by proper orientation of the facet of laser diode 40, is transmitted through double prism 42, reflected from scanning mirror 44, and is focused onto object 14 by a telescope formed by a positive lens in focus lens assembly 46 and by aperture lens 48. Scanning mirror 44 may be galvanometer mirror. Double prism 42 in the apparatus of this invention functions as a "receive-transmit switch." It allows outgoing light polarized in the P-plane to pass through the double prism and causes incoming light polarized in the S-plane to be reflected. Alternatively, double prism 42 may be replaced with an appropriately coated surface at Brewster's Angle or other known means for separating beams of light based on polarization. Focus lens assembly 46 includes quarter-wave plate 49, which changes the linearly polarized light passing through the assembly to circular polarization. The transverse position of focus lens assembly 46 is adjustable so that it may be adjusted to focus a laser beam in a spot on object 14 at the nominal working distance at which the profile or other measurements are to be made. Typically, the laser beam will be focused to a spot size less than about 200 microns in diameter.

After striking object 14, a portion of the laser light is scattered back into the aperture formed by lens 48. Since the scattered light emanates from the well defined focal spot on object 14, the scattered laser light is automatically within the field of view and depth of focus, and is aligned with the optical axis of the detector optics. After collection of the scattered light by aperture lens 48, the light passes back through quarter-wave plate 49 in focus lens assembly 46 and is converted to linearly polarized light in the S-plane. Focus lens assembly 46 collimates the received radiation. The received radiation then reflects from scanning mirror 44 and then, because of its orthogonal polarization to the outgoing light, reflects from the internal face in double prism 42. The returning light is then focused onto the active area of light detector 50, which is preferably an avalanche-photodiode detector, by lens 52. Detector 50 converts the received laser radiation into an electrical signal, which has a sinusoidal component at the frequency of frequency synthesizer 20. The AC part of the detected signal is amplified by low noise amplifier 28 and is input to second double balanced mixer 30, which is configured as a phase detector.

First double balanced mixer 26 is used to phase modulate the local oscillator signal from splitter 24, under command of microprocessor 22, by way of a digital to analog converter 32. The phase modulated local oscillator signal proceeds to the second mixer 30, where it is used to convert the amplified detector output from amplifier 28 to a low frequency, oscillating waveform whose amplitude is proportional to the cosine of the phase difference between the local oscillator and the detected signal, and whose frequency is the same as the signal generated by digital analog converter 32. Low pass filter 34, subsequent to second mixer 30, removes the sum frequency component from the output of mixer 30, leaving the difference frequency component. Two analog-to-digital converters, 36 and 38, sample the output from digital to analog converter 32 and phase detector 30, at a rate determined by microcontroller 22 and which is also above the Nyquist frequency of the output waveform from digital-to-analog converter 32.

After conversion to a pair of digital data streams inside the memory of microcontroller 22 by analog-to-digital converters 36 and 38, the digital data are multiplied together, element-by-element, and averaged. This process is the digital equivalent of an analog mixer and low pass filter and yields the final value for the relative phase. All signal processing done with mixer 26 and microcontroller 22 is designed to compensate for undesirable imbalance and non-linearity in second mixer 30 and is one of the signal processing steps which makes possible the high precision of the apparatus and method of this invention.

In operation, laser beam 16 is positioned on object 14 at a desired location and frequency synthesizer 20 is commanded to output a selected frequency, f. If the waveform out of digital analog converter 32 is a symmetric, bipolar square wave of amplitude $A_y$ at frequency g, the inputs at ports x and y of mixer 26 are:

$$x(t)=A_x\cos(2\pi ft)$$

$$y(t)=A_y(-1)^{\lfloor 2gt \rfloor}$$

where [a] is the greatest integer, or floor function and $A_x$ is the amplitude of the waveform from splitter 24. If the amplitude $A_y$ is sufficient to saturate the forward conduction of the diodes in the mixer, then the output of mixer 26 is $$z(t)=A_x\cos(2\pi ft+\pi(-1)^{\lfloor 2gt \rfloor})=A_x(-1)^{\lfloor 2gt \rfloor}\cos(2\pi ft),$$

which is simply the original local oscillator signal with an oscillating sign at the frequency g.

The detector-signal input to port u of the second mixer 30 can be written as:

$$u(t) = A_u \cos(2\pi ft + \phi),$$

where $\phi$ is the phase shift due to both the electronic component delay and the round-trip travel of the light to and from the object.

Mixer 30 forms the product of its inputs, plus a DC offset voltage $V_{os}$ that depends upon the imbalance in the mixer's internal components:

$$w(t) = \frac{k}{2} A_u A_x (-1)^{\lfloor 2gt \rfloor} \cos(\phi) + \frac{k}{2} A_u A_x (-1)^{\lfloor 2gt \rfloor} \cos(4\pi ft) + V_{os}.$$

The k-factor depends upon the particular mixer used and is a constant. The low-pass filter subsequent to mixer 30 removes the second term (sum-frequency). Now, ADC 36 and ADC 38 generate digital data streams to the microcontroller corresponding to:

$$ADC1(t) = A_y (-1)^{\lfloor 2gt \rfloor}$$

$$ADC2(t) = k/2 A_u A_x (-1)^{\lfloor 2gt \rfloor} \cos(\phi) + V_{os}$$

When these digital waveforms are multiplied together by the microcontroller, the result is $$\frac{k}{2} A_u A_y \cos(\phi) + A_y (-1)^{\lfloor 2gt \rfloor} V_{OS}$$

If this product signal is numerically averaged over an integral number of periods of the DAC 32 waveform, it can be seen that the second imbalance term vanishes, leaving a signal due solely to the phase shift.

$$s(t) = \frac{k}{2} A_u A_x A_y \cos(\phi)$$

The phase modulation of the local oscillator by mixer 26 removes the minute imbalances and offsets in both mixers, resulting in a clean, high-precision signal free of systematic artifacts.

The phase is related to the effective round-trip length to the object by $$\phi = \frac{2\pi f L_{\text{eff}}}{c}$$

where $L_{\text{eff}}$ is the sum of the optical round-trip path length and a free-space equivalent electronic component path length. Since the phase signal contains $2\pi$ ambiguities for useful values of the modulation frequency, f, or the effective range $L_{\text{eff}}$, and since the coefficient of the cosine term is variable with received light level, the microcontroller is programmed to seek values of the modulation frequency that coincide with a zero-crossing of s(t). It accomplishes this by writing a series of digital words to the frequency synthesizer's control registers, causing the synthesizer's output frequency to change. While doing so, the signal s(t) is computed until a series of frequencies are found that correspond to a zero value for s(t). These frequencies are related to the effective range by the relation $$f_m = \frac{c}{L_{\text{eff}}} (m + 1/2); m = 0, 1, 2 \ldots$$

The effective range is subsequently found by varying the frequency of synthesizer 20 to determine two adjacent zero-crossing frequencies of the same slope, and eliminating m between $f_m$ and $f_{m+2}$.

$$L_{\text{eff}} = \frac{2c}{f_{m+2} - f_m}$$

The range L from a predetermined selected position on the optical module, such as the output lens, to the object is then determined from a one-time calibration measurement against a target at known range. The known value of L is used to separate the electronic and the free-space parts of the effective range:

$$L = \frac{c}{(f_{m+2} - f_m)n} - \frac{L_{\text{electronic}}}{2}$$

Here, the index of refraction, n, of the free-space medium is included to explicitly account for changes in the measured range due to changes in temperature, humidity, composition, etc. Once the range has been found, simply tracking the zero-crossing frequency as a function of the scanning angle of the mirror allows new range measurements to be made quickly, and thus allows precise measurement of the surface profile of the scanned object. If all that is desired is to measure a surface profile of the remote surface, it is not necessary to determine electronic delay. In order to determine L to accuracies of a few ppm, it is necessary to control the frequency of synthesizer 20 to about 1 ppm. This is readily done with current oven-stabilized crystal-based oscillators.

Position of the area measured is calculated from measured orientation of mirror 44. Orientation of the mirror may be changed along one axis or along two axes, so as to scan the outgoing beam in one- or two-dimensions. If the area of the object being measured is moving transverse to the outgoing light beam, the distance calculated will be a time average of the distance. The time required to obtain stable measurements of distances at a selected location depends on the power of the light source and the scattering coefficient of the surface. For a 2 mW laser and a metal surface at a distance of about 1 meter, the time is of the order of one second. Shorter measurement times can be obtained by using a higher-power light source to increase the signal-to-noise ratio. Measured distances corresponding to calculated position of the area measured on the surface of an object may be displayed by any of known methods, such as printed, display screen or graphical.

The direct measurements made by the apparatus can be transformed into a convenient measurement coordinate system that is designated by the operator. This coordinate system may correspond to the coordinate system of a drawing of the remote surface being measured.

Apparatus of this invention can also be employed for detecting changes in distance from the apparatus to a selected area of a remote surface. From such changes, amplitude of vibration or signals resulting from vibration can be determined. Also, linear displacement, velocity or acceleration in the direction of the light source of the selected area on the remote surface can be determined. This is preferably accomplished by measure of the analog signal from low-pass filter 34. The absolute value of displacement corresponding to a given signal amplitude can be determined by calibration. Preferably, for maximum sensitivity, the frequency output from the waveform generator is adjusted such that the amplitude of the output signal from low-pass filter 34 is near zero when measurements begin.

This invention has been described with reference to its preferred embodiments. Those of ordinary skill in the art

What is claimed is:

1. Apparatus for measuring a difference in distance between a selected reference location on the apparatus and a plurality of areas of a remote surface, comprising:

a source of outgoing light capable of being modulated in amplitude at RF frequencies;

a source of an electrical waveform;

an electrical signal-splitter for delivering a first split electrical signal from the source of an electrical waveform to amplitude-modulate the source of outgoing light and a second split electrical signal from the source of an electrical waveform to a first mixer;

a light separator for separating the outgoing light and an incoming light, delivering the outgoing light to a scanning mirror and the incoming light to a light detector;

means for moving the mirror so as to direct light to and receive light from a plurality of areas of the surface;

an optical system for focusing the outgoing light from the scanning mirror onto the remote surface and receiving the incoming light from the surface;

a lens for collecting and directing onto the light detector the incoming light from the light separator;

an amplifier for amplifying an electrical signal from the light detector;

a second mixer configured as a phase detector for converting the signal from the amplifier to an oscillating signal having an amplitude proportional to the cosine of the phase difference between an electrical signal from the first mixer and the signal from the amplifier;

a low-pass filter to filter a signal from the second mixer;

a digital-to-analog converter for supplying an analog signal to the first mixer and to a first analog-to-digital converter for producing a first digital signal to a microcontroller;

a second analog-to-digital converter for receiving a signal from the low-pass filter and supplying a second digital signal to the microcontroller;

a processor for processing the first and second digital signals in the microcontroller; and an output device for outputting the difference in measured distances.

2. The apparatus of claim 1 wherein the source of light is a semiconductor diode laser.

3. The apparatus of claim 1 wherein the source of the electrical waveform is a phase-lock loop frequency synthesizer.

4. The apparatus of claim 1 wherein the light separator is a polarizing beam splitter and a quarter-wavelength plate.

5. Apparatus for measuring a difference in distance between a selected reference location on the apparatus and a plurality of areas of a remote surface, comprising:

a semiconductor diode laser;

a phase-lock loop frequency synthesizer;

an electrical signal-splitter for delivering a first split electrical signal from the phase-lock loop frequency synthesizer to amplitude-modulate the semiconductor diode laser and a second split electrical signal from the frequency synthesizer to a double-balance mixer;

a beam-splitter prism and a quarter-wavelength plate in series for delivering the outgoing light to a scanning mirror and an incoming light to a light detector;

a galvanometer scanning mirror for directing light to and receiving light from a plurality of areas of the surface;

a two-lens telescope for focusing the outgoing light from the scanning mirror onto the remote surface and receiving the incoming light from the surface;

a lens for collecting and directing onto the light detector the incoming light from the means for separating outgoing and incoming light;

an amplifier for amplifying an electrical signal from the light detector;

a double-balance mixer for converting the signal from the amplifier to an oscillating signal having an amplitude proportional to the cosine of the phase difference between an electrical signal from the first mixer and the signal from the amplifier;

a low-pass filter to filter a signal from the second mixer;

a digital-to-analog converter for supplying an analog signal to the first mixer and to a first analog-to-digital converter for producing a first digital signal to a microcontroller;

a second analog-to-digital converter for receiving a signal from the low-pass filter and supplying a second digital signal to the microcontroller;

a processor for processing the first and second digital signals in the microcontroller; and means for outputting the difference in measured distances.

6. A method for determining the difference in distance between a reference location on optical apparatus and different selected areas of a remote surface, comprising:

providing a source of outgoing light having an amplitude modulated by a first electrical signal at an RF frequency;

reflecting the outgoing light at a moveable mirror at a first scanning angle and focusing the light on a first selected area of the surface;

collecting scattered light from the surface and directing the scattered light to a photodetector to produce a second electrical signal having a component at the same selected frequency;

phase modulating the first electrical signal and using the phase modulated signal to convert the second electrical signal to an analog signal having an amplitude proportional to the cosine of the phase difference between the first and second electrical signals, low-pass filtering the analog signal and converting the analog signal to a digital signal;

multiplying the digital signal with a signal derived from a measurement of a signal used to phase modulate the first electrical signal and averaging the resulting values to form a value for the relative phase of the first and second electrical signals;

changing the selected RF frequency to find two frequencies, $f_m$ and $f_{m+2}$, that produce a zero value for the relative phase of the first and second electrical signals when the value of the relative phase is changing the same direction with change in frequency;

calculating a first value of effective range, $L_{eff}$, from the equation $$=L_{eff}=2c/(f_{m+2}-f_m);$$

changing the scanning angle of the mirror to a second scanning angle to focus the light on a second selected area and measuring the change in the values of ($f_{m+2}-f_m$) and calculating a second value of $L_{eff}$; and subtracting the first and second values of $L_{eff}$ to determine the difference in distance between the optical apparatus and the first and second selected areas.

7. The apparatus of claim 6 wherein the source of light is a semiconductor diode laser.

8. The apparatus of claim 6 wherein the source of the electrical waveform is a phase-lock loop frequency synthesizer.

9. The apparatus of claim 6 wherein the light separator is a polarizing beam splitter and a quarter-wavelength plate.

10. A method for determining a distance, $L_{unknown}$, between a reference location on optical apparatus and a selected area of a selected remote surface, comprising:

placing a selected area of a first remote surface at a known distance, L, from the reference location in a medium having index of refraction, n;

providing a source of outgoing light having an amplitude modulated by a first electrical signal at an RF frequency;

reflecting the outgoing light at a mirror and focusing the light on the selected area of the first remote surface;

collecting scattered light from the selected area and directing the scattered light to a photodetector to produce a second electrical signal having a component at the same RF frequency;

phase modulating the first electrical signal and using the phase modulated signal to convert the second electrical signal to an analog signal having an amplitude proportional to the cosine of the phase difference between the first and second electrical signals, low-pass filtering the analog signal and converting the analog signal to a digital signal;

multiplying the digital signal element-by-element with a signal derived from a measurement of a signal used to phase modulate the first electrical signal and averaging the resulting values to form a final value for the relative phase of the first and second electrical signals;

changing the selected RF frequency to find two frequencies, $f_m$ and $f_{m+2}$, that produce a zero value for the relative phase of the first and second electrical signals when the value of the relative phase is changing the same direction with change in frequency;

determining a calculated value of $L_{electronic}$ using the equation $$L=c/((f_{m+2}-f_m)n)-L_{electronic}/2;\text{ and}$$

thereafter, determining the distance between the reference location and the selected area of the selected remote surface, $L_{unknown}$, using the calculated value of $L_{electronic}$ and the same equation, where $L_{unknown}$ is substituted for L.

11. The method of claim 10 wherein the source of outgoing light is a semiconductor diode laser.

12. The method of claim 10 wherein the source of the electrical waveform is a phase-lock loop frequency synthesizer.

13. The method of claim 10 wherein the light separator is a polarizing beam splitter and a quarter-wavelength plate.

14. A method for detecting vibration or linear movement of a selected area of a remote surface, comprising:

providing a source of outgoing light having an amplitude modulated by a first electrical signal at a selected RF frequency;

reflecting the outgoing light and focusing the light on the selected area of the surface;

collecting scattered light from the surface and directing the scattered light to a photodetector to produce a second electrical signal having a component at the same selected RF frequency;

phase modulating the first electrical signal and using the phase modulated signal to convert the second electrical signal to an analog signal having an amplitude proportional to the cosine of the phase difference between the first and second electrical signals and low-pass filtering the analog signal;

changing the selected RF frequency to find a frequency, f, that produces a zero value for the analog signal; and outputting the analog signal to indicate vibration or linear displacement of the selected area of the remote surface.

15. The method of claim 14 wherein the source of outgoing light is a semiconductor diode laser.

16. The method of claim 14 wherein the first electrical signal is produced by a phase-lock loop frequency synthesizer.

* * * * *